US012325574B1

(12) United States Patent
Mataczynski

(10) Patent No.: US 12,325,574 B1
(45) Date of Patent: Jun. 10, 2025

(54) SHIPPABLE CRATE

(71) Applicant: Craft Crate LLC, Bailey, CO (US)

(72) Inventor: James Mataczynski, Bailey, CO (US)

(73) Assignee: Craft Crate LLC, Bailey, CO (US)

( * ) Notice: Subject to any disclaimer, the term of this patent is extended or adjusted under 35 U.S.C. 154(b) by 0 days.

(21) Appl. No.: 18/123,937

(22) Filed: Mar. 20, 2023

(51) Int. Cl.

| | |
|---|---|
| ***B65D 25/30*** | (2006.01) |
| ***B65D 51/24*** | (2006.01) |
| ***B65D 63/10*** | (2006.01) |
| ***B65D 77/06*** | (2006.01) |
| ***B65D 81/24*** | (2006.01) |
| ***B67D 3/00*** | (2006.01) |

(52) U.S. Cl.
CPC ............ *B65D 81/24* (2013.01); *B65D 25/30* (2013.01); *B65D 51/245* (2013.01); *B65D 63/10* (2013.01); *B65D 77/06* (2013.01); *B67D 3/0067* (2013.01); *B65D 2203/02* (2013.01)

(58) Field of Classification Search
CPC ...... B65D 81/24; B65D 25/30; B65D 51/245; B65D 63/10; B65D 77/06; B65D 2203/02; B67D 3/0067
See application file for complete search history.

(56) References Cited

U.S. PATENT DOCUMENTS

| | | | | |
|---|---|---|---|---|
| 4,105,139 | A * | 8/1978 | Scholle | B65D 77/06 222/105 |
| 6,789,707 | B2 * | 9/2004 | Wright | B65D 83/0077 222/326 |
| 7,007,725 | B2 * | 3/2006 | Peltier | B67D 3/0038 141/10 |
| 8,733,598 | B2 * | 5/2014 | Nelson | B67D 7/72 222/481.5 |
| 8,800,814 | B2 * | 8/2014 | Braun | B67D 3/0051 222/105 |
| 11,046,569 | B2 * | 6/2021 | Russell | B67D 1/0406 |
| 2003/0102333 | A1 * | 6/2003 | Wright | B67D 1/0001 222/386 |
| 2008/0237260 | A1 * | 10/2008 | Wolek | B67D 3/0009 222/105 |
| 2009/0120956 | A1 * | 5/2009 | De La Fe Dahlin | B65D 77/06 222/105 |
| 2010/0155437 | A1 * | 6/2010 | Broadbent | A45C 11/20 224/148.1 |
| 2012/0104041 | A1 * | 5/2012 | Coleman | B67D 3/0054 222/105 |
| 2023/0030137 | A1 * | 2/2023 | McIntyre | B29B 7/90 |

* cited by examiner

*Primary Examiner* — Frederick C Nicolas
(74) *Attorney, Agent, or Firm* — Run8 Patent Group, LLC; Peter Miller

(57) ABSTRACT

A crate system for pouring a liquid including: an exterior container; a collapsible bag; a compression strap wrapped around the collapsible bag and encircling an anterior volume of the exterior container; and a faucet including a handle. The crate system stores a liquid product without affecting quality (e.g., carbonation) of the liquid product. The crate system can be shipped through the mail or sold over the counter at departmental stores, bars, restaurants, wineries, and other end user commercial establishments.

10 Claims, 5 Drawing Sheets

SHIPPABLE CRATE

FIELD OF THE INVENTION

The present invention relates to beverage makers/providers (beer, kombucha, soda, other carbonated and non-carbonated liquids) to package and sell their liquid product outside of their establishment without affecting the quality (e.g. carbonation) of the liquid product, and maintaining the overall cost.

BACKGROUND OF THE INVENTION

There are many wineries, distilleries, breweries and other beverage makers that make their own beverages. The brewers usually make, store and sell mostly on-site or supply to nearby restaurants, breweries, bars, etc. Such establishments have to depend on manufacturing and packaging companies to manufacture and package their beverages to be sold outside of their establishments which makes the beverages expensive for the customers or results in loss for the brewer. Since many such beverages, e.g. craft beer, are not available outside of wineries or bars, the options are limited and does not provide a selection to pick from. Moreover, the limited options are expensive, and impact the quality of the product once opened or if not stored properly.

Therefore, a need remains for beverage makers to be able to provide an option to sell a quality product outside of their establishment. Furthermore, a gap exists in the packing process for an option which is environmentally friendly and provides cost effective ease of transportation across the country.

SUMMARY OF THE INVENTION

This Summary is provided to introduce a selection of concepts in a simplified form that are further described below in the Detailed Description of the invention. This Summary is not intended to identify key aspects or essential aspects of the claimed subject matter. Moreover, this Summary is not intended for use as an aid in determining the scope of the claimed subject matter.

The present application discloses a crate system for beverage makers to pack and sell their beverages to their regular customers without relying on package companies which in return makes it expensive for both beverage makers and buyers.

It is an object of this invention to provide a crate system comprising an exterior container, a collapsible bag, a compression strap in the middle of the exterior container and the collapsible bag, wherein the compressible strap is wrapped around the collapsible bag and a faucet with handle.

It is another object of this invention to provide a collapsible bag or a bladder which can hold any type of liquid. The collapsible bag filled with any liquid will have all its gases sealed therein. When the liquid is dispensed, the collapsible material of the bag allows it to conform to its new volume. With aid of the compression strap, the collapsible bag collapses and holds its smaller volume thereby maintaining the integrity of the liquid.

It is still another object of the invention to provide a two-way faucet attached to the collapsible bag wherein a dispense port of the faucet hooks up directly to any serving vessel faucet via a filling tube and fills itself using the pressure of the serving vessel. The same dispense port of the faucet is further used to dispense liquid as well.

It is still an additional object of the invention to provide a crate system that can be shipped through the mail or sold over the counter at departmental stores, bars, restaurants, wineries, and other end user commercial establishments.

It is a further object of the invention to provide a crate to customers wherein they can pour themselves the desired amount of their favorite drink/beverage with same taste as it would taste at the commercial establishment while maintaining beverage integrity until empty.

In a preferred embodiment, a crate system for filling and pouring a liquid comprises an exterior container with two slots on each side to hold the said container; a 4-sided compression strap in the middle to provide compression and maintain constant pressure; a sterile collapsible bag with an opening on one side in the bottom center, wherein the said collapsible bag is situated in the inside of the said compression strap, wherein the said compression strap maintains the shape and pressure of the said collapsible bag in the said exterior container; and a faucet with handle, wherein the said faucet enables filling of liquid within the said collapsible bag, wherein the said faucet is used to dispense the said liquid out of the said collapsible bag in a vessel.

These together with other objects and advantages which will become subsequently apparent reside in the details of the invention as more fully described and claimed, reference being had to the accompanying drawings forming a part thereof, wherein like numerals refer to like parts throughout.

BRIEF DESCRIPTION OF THE DRAWINGS

The novel features of the invention, as well as the invention itself, both as to its structure and its operation will be best understood from the accompanying drawings, taken in conjunction with the accompanying description, in which similar reference characters refer to similar parts, and in which.

DETAILED DESCRIPTION OF THE INVENTION

Figure 1:
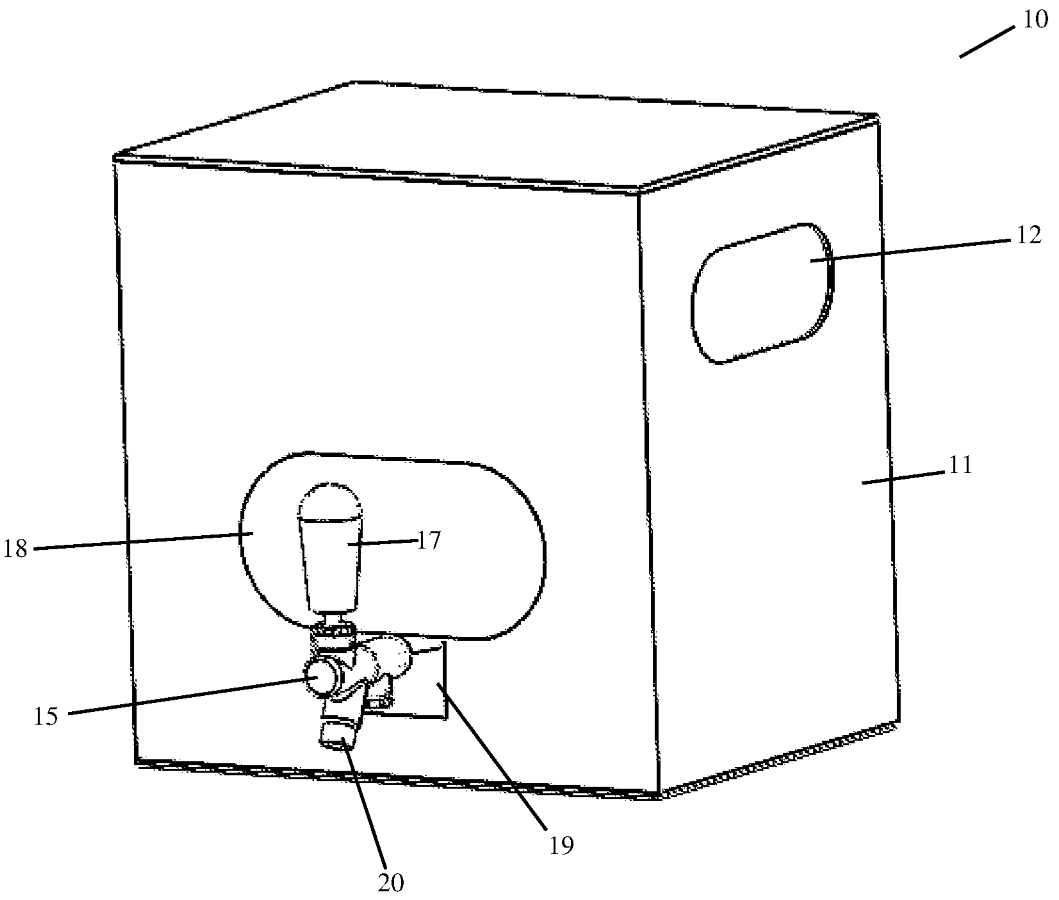
FIG. 1: shows a front view of the assembled crate system according to the present invention.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes.

The crate system of the present invention comprises an exterior container, a middle compression strap, a collapsible bag in the inside of the compression strap and container, and a faucet with a handle.

As shown in FIG. 1, the assembled crate system (10) shows an exterior container or a box (11) with a faucet (15) and a tap handle (17). It further includes oval slots on the two opposite sides of the exterior container to hold and carry the said exterior container. FIG. 1 shows only one oval slot (12) on one side of the container (11). The container (11) is preferably made of cardboard thereby making it easily foldable before and after use and stackable when assembled. Further, the cardboard material keeps the weight of the crate system light which makes it easy to ship and transport the crate system of the present invention. However, the container (11) can also be made from plastic, wood, or metal. The container (11) can be of any shape including, but not limited to, cuboid or cube. The exterior container further includes pre-cut flaps (19) at the bottom center on one of the faces of the container.

Figure 2:
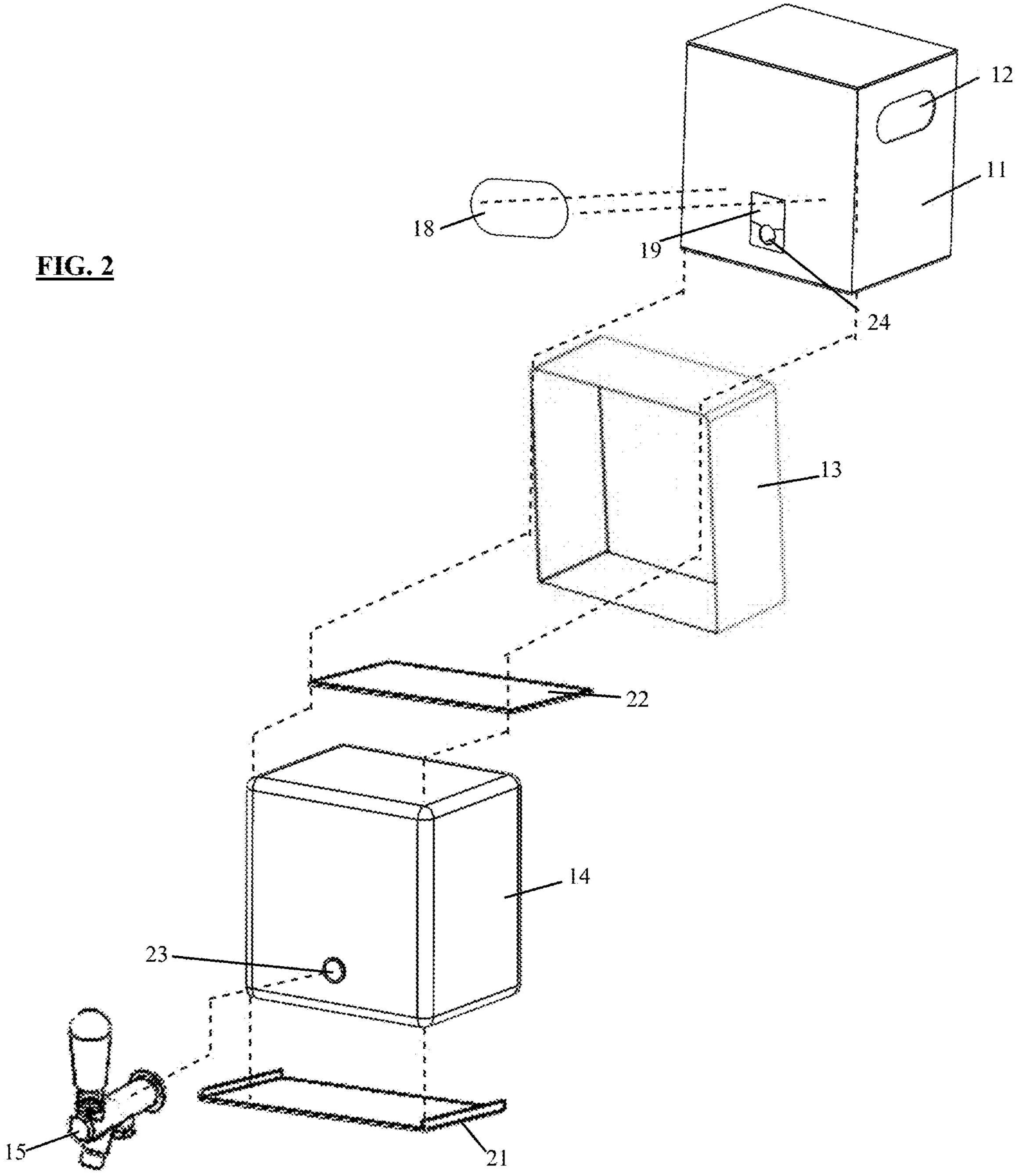
FIG. 2: shows an exploded view of the crate system with flaps closed according to the present invention.

FIG. 2 shows an exploded view of the crate system (10) of the present invention. As shown in FIG. 2, the crate system includes an exterior container (11), a compression strap (13), a pressure plate (22), a collapsible bag (14), a bottom cradle (21), a faucet (15) and a self-adhesive label (18).

The collapsible bag or bladder (14) holds the liquid and takes up the volume and shape as per the amount of liquid filled. The collapsible bag (14) when filled with the liquid will further take the shape of the exterior container. The collapsible bag (14) also shrinks when the liquid is poured out of the collapsible bag and the entire package will collapse mechanically holding it to a smaller volume. The collapsible bag (14) in the crate system is sterile before use thereby maintaining all the properties of the liquid it is holding. The sterile collapsible bag provides a stable environment for any kind of liquids, beverages or solutions. The beverages that can be filled in the collapsible bag includes, but not limited to, beer, wine, soda, kombucha, carbonated water or non-carbonated liquid. The collapsible can also store IV fluid or any medicinal solution. It is made up of heavy duty BPA, phthalate & lead free, food grade material. The collapsible bag is preferably made up of plastic as it is light-weight, durable, inexpensive, resistant to corrosion and easy to modify material.

As shown in FIG. 2, the crate system further includes a compression strap or band (13) placed between the exterior container (11) and the collapsible bag (14) wherein it wraps around the collapsible bag (14) preventing it from expanding and maintaining its shape in the exterior container (11). The compression band (13) is preferably made up of rubber thereby making it stretchable and is preferably cuboid or cube in shape to wrap around the collapsible bag (14). The dimensions of the compression band (13) may vary depending upon the liquid being stored in the collapsible bag (14). The compression strap or band (14) is used to maintain a constant pressure throughout the storage, transportation and even when volume of the liquid is reduced thus not allowing carbonation to be released from the liquid stored in the collapsible bag. Further, the compression strap will change in shape according to the volume of the liquid stored in the collapsible bag. The compression strap can be placed around the collapsible bag before or after filling the liquid. When the compression strap is put afterwards, it is stretched to insert the collapsible bag.

The crate system (10) may further include a bottom cradle (21) in which the collapsible bag (14) sits to slide inside the assembled exterior container (11). It is preferably made of plastic or cardboard material in order to keep the weight of the crate system light for shipping and transportation. It also helps in maintaining the shape of the collapsible bag within the exterior container. There is also a rectangular pressure plate (22), as shown in FIG. 2, placed on the top surface of the collapsible bag (14) and underneath the compression strap (13) to put pressure on the collapsible bag thereby helping in holding its shape. The pressure plate is preferably made of plastic or cardboard.

The crate system (10) of the present invention further comprises a faucet (15) attached at the faucet attachment (23) located on the collapsible bag (14) for filling and pouring out the liquid. The faucet (15) further includes a dispense port (20) for pouring out the liquid from the collapsible bag (14) into a drinking or dispensing vessel. The faucet (15) will preferably be injection molded or any other process known in the art. The faucet is a two-way faucet which enables both filling of the liquid in the collapsible bag (14) and pouring out of the collapsible bag (14). The faucet enables the filling of liquid in vertical position upwards, wherein the tap handle (17) of the faucet (15) moves it in open position which lets the liquid enter through the dispense port (20). The filling of liquid proceeds until the liquid reaches the brim of the purge port (16). The purge port (16) is then closed and the faucet (15) is ready to be used to dispense the liquid into a pitcher or glass.

The collapsible bag (14) in combination with the faucet (15) does not allow carbonation to escape when drink is dispensed, thereby maintaining the taste of the liquid and prolonging the shelf-life of the liquid.

Figure 3:
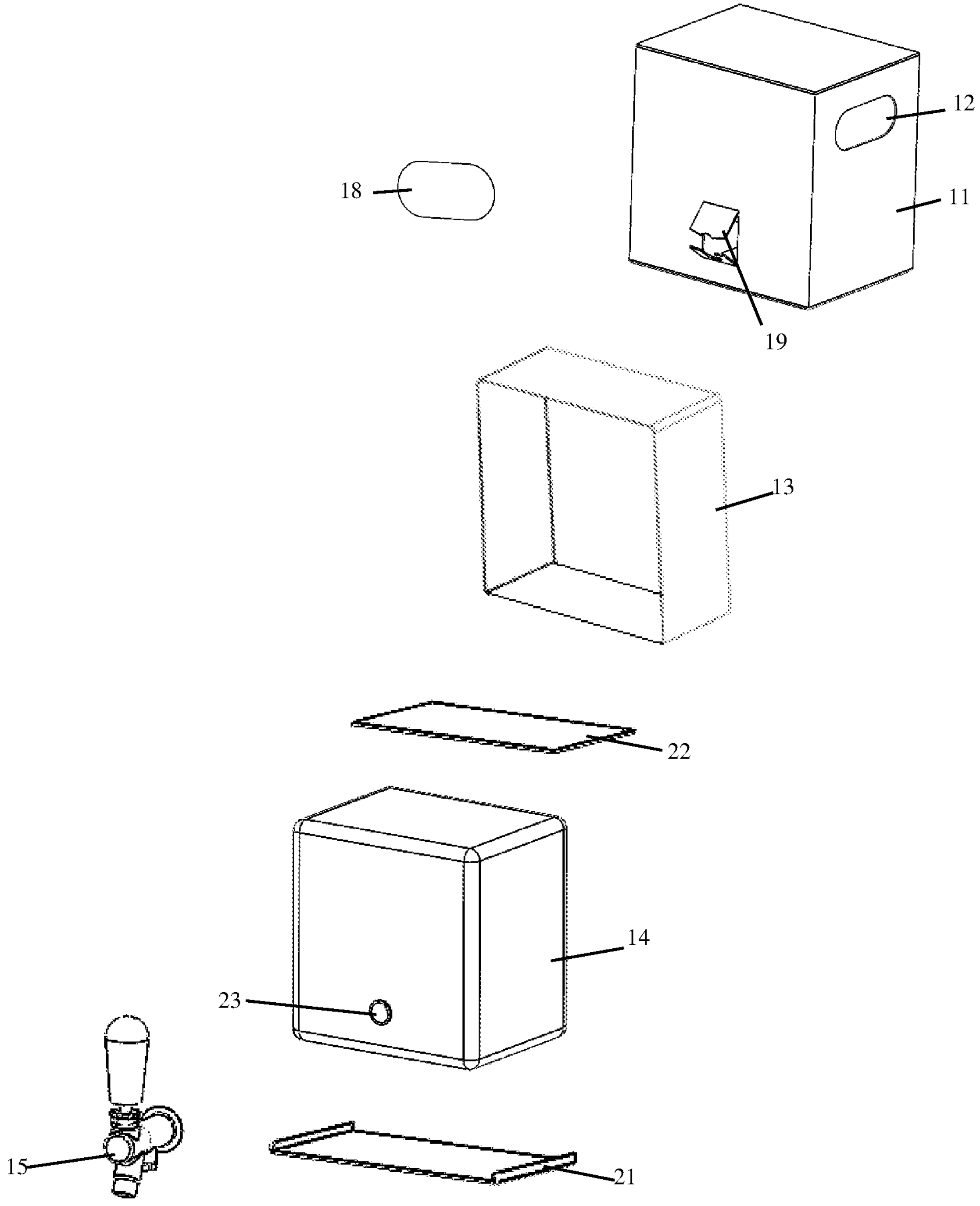
FIG. 3: shows an exploded view of the crate system with flaps open according to the present invention.
Figure 4:
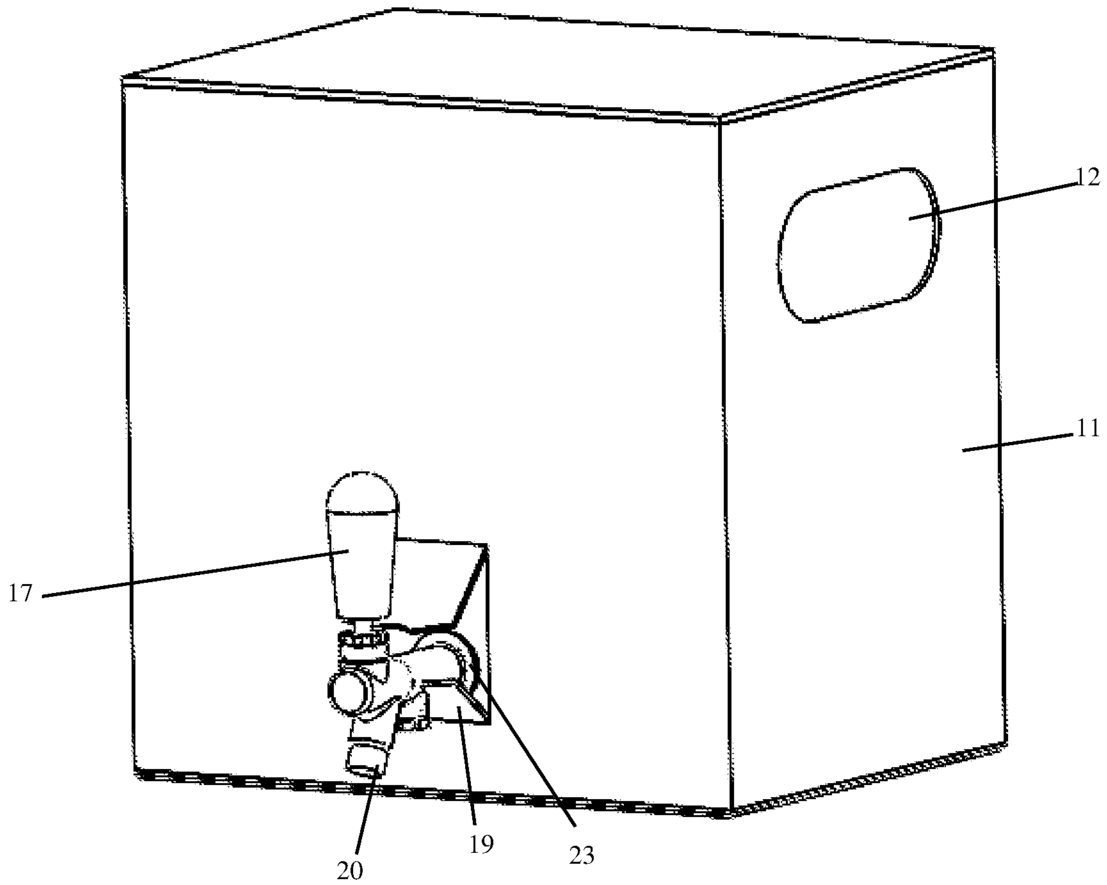
FIG. 4: shows an assembled crate system with flaps open according to the present invention.
Figure 5:
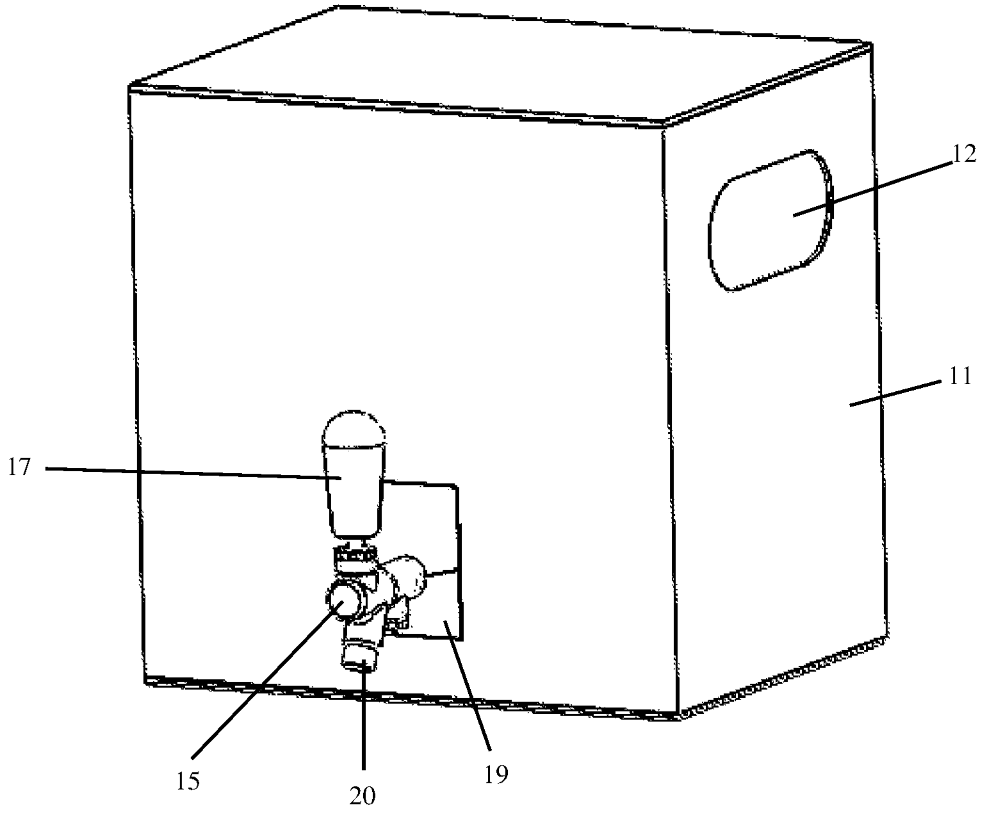
FIG. 5: shows an assembled crate system with flaps closed according to the present invention.

The container is partially perforated at the bottom on one side/face to make the two interlocking flaps (19), as can be seen in FIGS. 2-4, one at top and the other at bottom. The inter-locking flaps (19) further have a circular opening (24) in the middle where they meet each other to allow the faucet (15) to go through the flaps and wrap around the faucet (15) and to help to secure its position. FIG. 3 shows the two interlocking flaps (19) open whereas FIG. 4 shows a faucet (19) pulled out from the inside of the container (11) through the two interlocking flaps (19). When the faucet is pulled out from the inside of the container and through the flaps and the circular opening (24), the faucet and the two flaps join and connect with each other to form one unit. The crate system further includes a self-adhesive label (18) to secure the faucet (15) in the its place when pulled out through the two flaps (19) located at the bottom of the exterior container (11). The self-adhesive label (18) is preferably placed above the faucet (15) over either of the two flaps (19) thereby locking the faucet (15) further in its position. The label (18) can be of any shape like, but not limited to, oval, rectangle or square. For the purposes of this invention, the label (18) is an oval shape and is placed on the top flap, above the faucet as shown in FIG. 1. In addition, the self-adhesive label can be used to display or advertise the details of the manufacturer, breweries, wineries, and the like.

The crate system (10) disclosed herein may come in various sizes including, but not limited to the equivalent volumes of 6 or 12 regular bottles of beer, wine, soda, carbonated water, nitrogenated coffee. Further, the size of the crate system can be scalable as per the demand. The crate system can be used to dispense drinks or liquids stored in there into drinking pitcher, glasses, flasks, carafe, jars, or containers of any shape and size.

The crate system (10) of the present invention can also be used to hold including, but not limited to, sterile or distilled water, IV fluids, or any other liquid product.

The crate system (10) of the present invention is supplied in a bundled box wherein the exterior container is provided separately, and the compression strap, bottom cradle, and top pressure plate are packaged together and the collapsible bag with the affixed faucet is boxed separately. Alternatively, the collapsible bag with affixed faucet can be packaged with the bottom cradle and top plate followed by the compression band wrapped around with only liquid to be filled and ready to be either shipped or use.

The beverage makers or establishments can sell crate systems with liquid filled in. The liquid, for e.g. wine or beer can be filled from the brewery vessel containing wine or beer via a dispensing filling tube wherein one end is attached to the brewery vessel and the other end is attached to the dispense port of the faucet affixed to the collapsible bag and the faucet is in open flow position. After the liquid is filled in the collapsible bag, the bag can slide into the exterior container. The container is then sealed and ready to be shipped to a retailer or a customer.

Alternatively, the crate system can be assembled, filled and used at the same location. The liquid is filled in the collapsible bag through the faucet, the collapsible bag is slid into the exterior container and the faucet affixed to the collapsible bag is pulled out from the two flaps located on the exterior container. The self-adhesive label is placed over the flaps and the faucet to lock the faucet in its place. The crate system is ready to pour out the liquid into a dispensing or serving vessel.

While many of the fundamental characteristics and features of the crate system have been described herein, with reference to particular embodiments thereof, a latitude of modification, various changes and substitutions are intended in the foregoing disclosure, and it should be apparent that in some instances some features of the invention will be employed without a corresponding use of other features without departing from the scope of the invention as set forth. It should be understood that such substitutions, modifications, and variations may be made by those skilled in the art without departing from the spirit and scope of the invention. Consequently, all such modifications and variations are included within the scope of the invention as defined herein.

The invention claimed is:

1. A crate system for filling and pouring a liquid comprising:
- an exterior container comprising a set of slots arranged on sides of the container for holding the exterior container;
- a sterile collapsible bag comprising an opening on a first side of the sterile collapsible bag proximal a bottom of the sterile collapsible bag;
- a compression strap:
  - defining four sides;
  - arranged within the exterior container;
  - encircling an interior volume of the exterior container;
  - situated against sides of the sterile collapsible bag; and
  - configured to compress the sterile collapsible bag to maintain a constant pressure within the sterile collapsible bag;
- a rectangular pressure plate:
  - arranged across a top surface of the sterile collapsible bag;
  - interposed between the top surface of the sterile collapsible bag and an upper side of the compression strap; and
  - configured to:
    - distribute compressive forces, applied by the compression strap, across the top surface of the sterile collapsible bag; and
    - maintain a shape of the top surface of the sterile collapsible bag within the exterior container; and
- a faucet:
  - coupled to the opening of the sterile collapsible bag;
  - comprising a handle; and
  - configured to:
    - enable filling of the liquid into the sterile collapsible bag via the opening; and
    - dispense the liquid out of the sterile collapsible bag via the opening.

2. The crate system of claim 1:
- further comprising a bottom cradle arranged in the exterior container;
- wherein the sterile collapsible bag is configured to seat in the bottom cradle and to slide inside the exterior container.

3. The crate system of claim 1:
- wherein the exterior container defines a bottom face partially perforated to form two interlocking flaps that cooperate to define a circular aperture; and
- wherein the faucet is configured to insert into the circular aperture and is secured by the two interlocking flaps.

4. The crate system of claim 3, further comprising a self-adhesive label configured to secure the faucet within the circular aperture when pulled through the two interlocking flaps.

5. The crate system of claim 1, wherein the faucet is configured to receive the liquid to fill the sterile collapsible bag when the faucet occupies a vertical upward-facing position.

6. The crate system of claim 1, wherein the sterile collapsible bag is configured to store the liquid selected from the set comprising beer, wine, soda, and carbonated water.

7. The crate system of claim 1, wherein the exterior container defines a cuboid geometry.

8. The crate system of claim 1, wherein the sterile collapsible bag fills an interior volume defined by the exterior container when filled with the liquid.

9. A crate system for filling and pouring a liquid comprising:
- an exterior container:
  - comprising a set of slots arranged on sides of the container for holding the exterior container;
  - defines a bottom face partially perforated to form two interlocking flaps that cooperate to define a circular aperture;
- a sterile collapsible bag comprising an opening on a first side of the sterile collapsible bag proximal a bottom of the sterile collapsible bag;
- a compression strap:
  - defining four sides;
  - arranged within the exterior container;
  - encircling an interior volume of the exterior container;
  - situated against sides of the sterile collapsible bag; and
  - configured to compress the sterile collapsible bag to maintain a constant pressure within the sterile collapsible bag; and
- a faucet:
  - coupled to the opening of the sterile collapsible bag;
  - comprising a handle;
  - configured to insert into the circular aperture;
  - secured against the exterior container by the two interlocking flaps
  - configured to enable filling of the liquid into the collapsible bag via the opening; and
  - configured to dispense the liquid out of the collapsible bag via the opening; and
- a self-adhesive label configured to secure the faucet within the circular aperture when the faucet pulled through the two interlocking flaps.

10. The crate system of claim 9, further comprises a rectangular pressure plate:
- arranged across a top surface of the sterile collapsible bag;
- interposed between the top surface of the sterile collapsible bag and an upper side of the compression strap; and configured to:

distribute force, applied by the compression strap, across the top surface of the sterile collapsible bag; and maintain the shape of the top surface of the sterile collapsible bag.

* * * * *